July 19, 1927.
F. W. LANCHESTER
1,636,673
AUTOMOBILE VEHICLE
Filed April 27, 1925
3 Sheets-Sheet 1
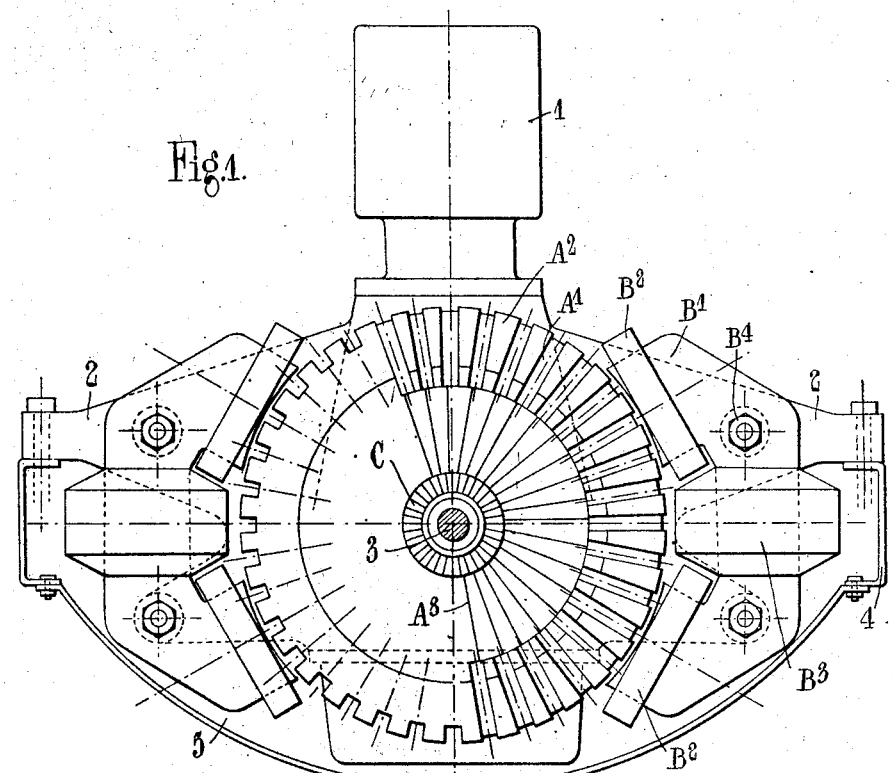
Fig.4.
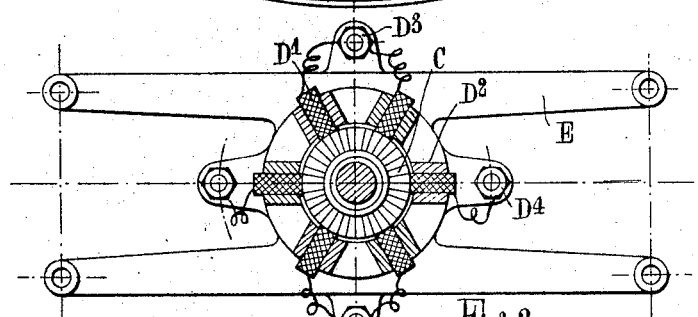
Fig.2.
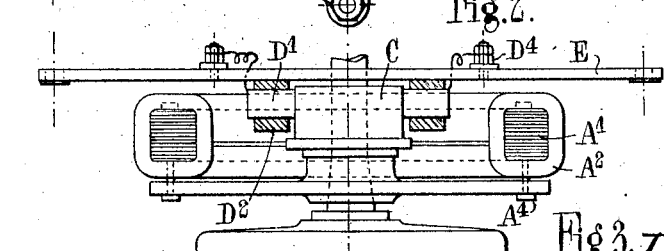
Fig.3. Inventor
F. W. Lanchester

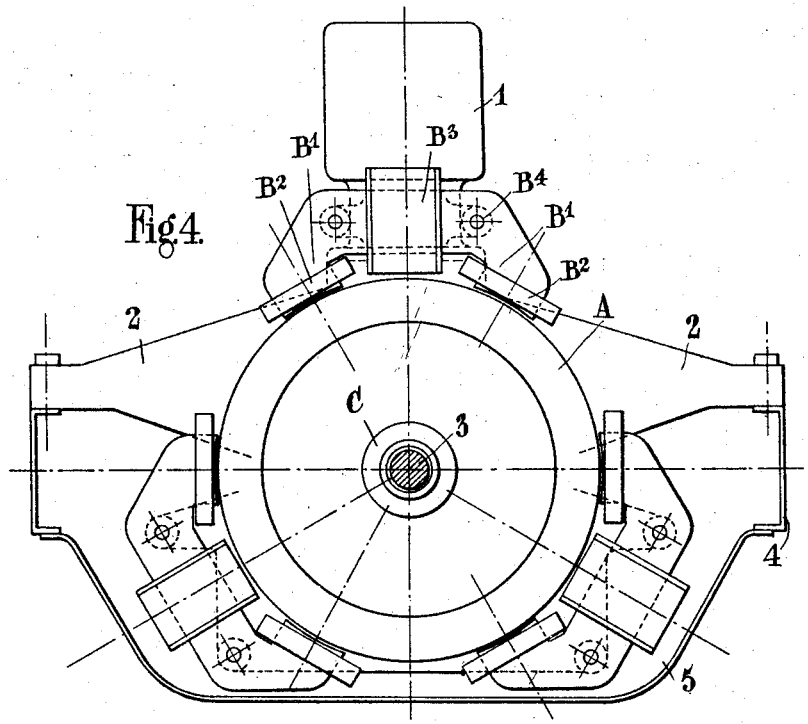
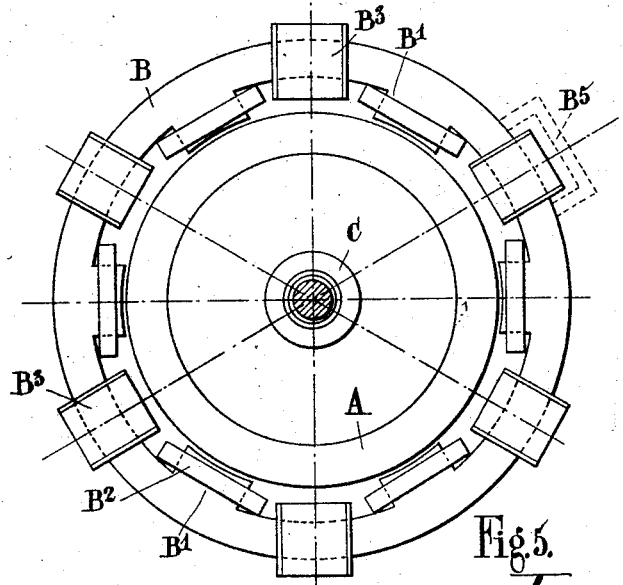

July 19, 1927.  F. W. LANCHESTER  1,636,673
AUTOMOBILE VEHICLE
Filed April 27, 1925   3 Sheets-Sheet 3

Inventor
F. W. Lanchester
By Marko ...
Attys.

Patented July 19, 1927.

1,636,673

UNITED STATES PATENT OFFICE.

FREDERICK WILLIAM LANCHESTER, OF BIRMINGHAM, ENGLAND, ASSIGNOR TO LANCHESTER'S LABORATORIES, LIMITED, OF COVENTRY, ENGLAND.

AUTOMOBILE VEHICLE.

Application filed April 27, 1925, Serial No. 26,255, and in Great Britain May 2, 1924.

The present invention relates to improvements in automobile vehicles and refers more particularly to improvements in electromechanical power systems of the type in which the transmission from engine to road wheel axle is mechanical and in which in connection with the said transmission a dynamo electric machine coupled to a storage battery is arranged to act, the said dynamo electric machine acting as a dynamo or generator when the whole power of the engine is not required and as an electro-motor when for climbing a steep gradient or overcoming exceptional resistance the engine is not equal to its task.

It is understood that where reference is made to petrol electric transmission it is intended to denote an internal combustion engine or other prime mover acting in association with an electrical equipment as defined. The word "engine" in the present specification is employed to denote the prime mover aforesaid, the word "motor" is reserved for the dynamo electric machine when acting in that capacity and the word "power-unit" is employed to denote the prime mover associated with a dynamo electric machine.

In petrol electric systems of the kind defined, as heretofore carried out, it has been usual to employ one or more shunt wound dynamo electric machines and the change from the dynamo state to the motor state has been determined by the speed at which the back E. M. F. of the dynamo electric machine becomes equal to that necessary for the charging of the battery or, in other words, sufficient to prevent the battery current from flowing. So long as the speed of the transmission shaft to which the dynamo electric machine is coupled has been below this critical point the dynamo electric machine has acted as a motor and drawn current from the battery. When the critical speed has been exceeded the dynamo electric machine has acted as a dynamo and supplied current to the battery, that is to say above the critical speed surplus energy passes from the engine to the battery and below this critical speed vice versa. Moreover, in the systems as previously carried out it has been necessary to employ a clutch for starting the vehicle, the dynamo electric machine being used as an engine starter and giving only a moderate addition to the engine torque. In consequence of this the engine power in relation to the speed of the vehicle had to be higher than was normally necessary in order to enable the vehicle to overcome extreme gradients, so that the system was only applicable to services where the extreme gradient was not excessive and where a great economy in fuel was not considered vital.

The present invention has for its objects to provide a dynamotor having a greater torque and to allow of the better control of the charging and motor régimes in order to prevent excessive currents entering the battery and to avoid the necessity of a clutch and enable the motor to start both engine and car from standing.

Referring to the accompanying sheets of illustrative drawings which are diagrammatic:—

Figure 1 illustrates a form of carrying the invention into effect in which a dynamo electric machine is applied as auxiliary to a petrol engine of the customary type and in which the dynamotor is of the four-pole type;

Figure 2 gives in greater detail the arrangement of commutator and brushes with connections appropriate to same;

Figure 3 is a plan part section of the detail given in Figure 2;

Figure 4 is an alternative or modification in which the dynamo electric machine is of the six-pole type with poles equally spaced;

Figure 5 illustrates a similar disposition of poles in which the field magnet is of the customary design;

Figures 6, 7, 8:
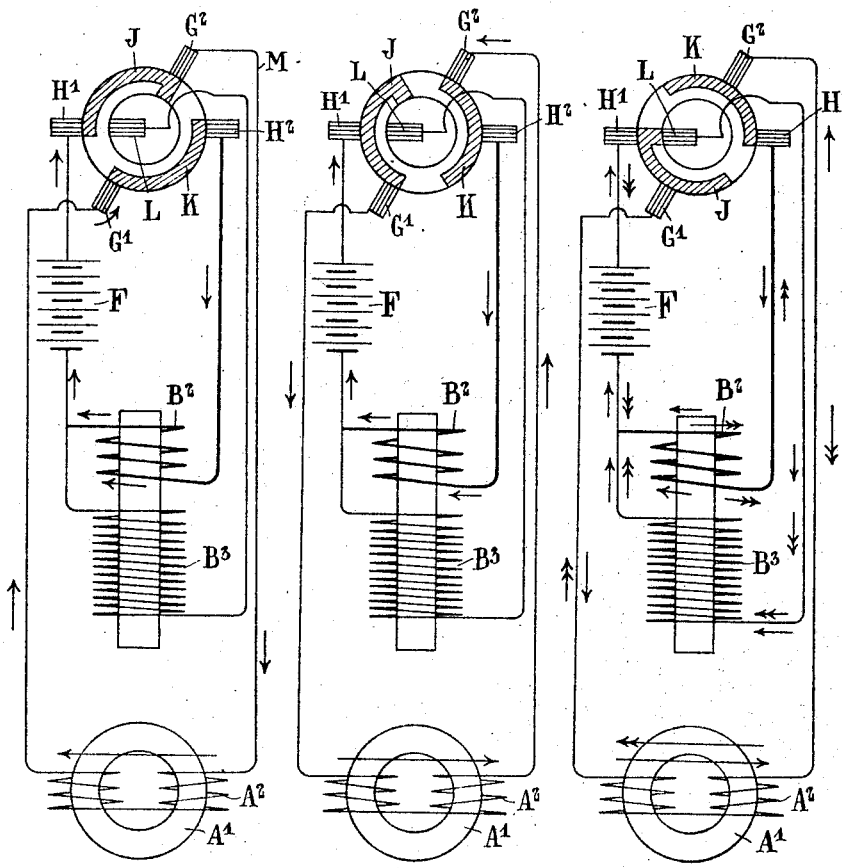

Figures 6, 7, and 8 are diagrams of the electrical connections showing the controller in three different positions.

Figure 9:
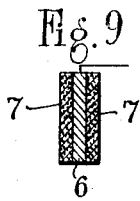

Fig. 9 is a sectional elevation of a modified form of brush employed in the apparatus.

In one mode of carrying the present invention into effect in the form illustrated by way of example in Figures 1 to 3 as concerns the power unit, that is to say the combination of engine and dynamo electric machine, the flywheel of the engine is constructed as a gramme ring armature $A_1$ and the commutator C is conveniently housed within the said ring and connected to the windings $A_2$ of the armature by means of truly radial connections $A_3$.

The field magnet cores $B_1$ are mounted one on each side on extensions 2 of the base chamber which also may be two of the arms on which the engine is supported and on the poles of the said magnets series windings $B_2$ are arranged. The central portion of the magnet carries the shunt winding $B_3$ and the two portions of the field magnets which are exposed between the shunt winding and the series winding are used for the purpose of attachment by means of the bolts and nuts $B_4$. These portions of the magnet also provide for magnetic leakage for the purpose hereinafter described and the extent of the said magnetic leakage may be controlled by the shape of these intervening portions.

1 is the engine cylinder which may be a single cylinder or may represent the cylinder block or assemblage of a number of cylinders in a multi-cylinder engine, 2 and 2 are the arms of the crank case shown as bolted to the chassis members 4. The crankshaft is shown in section at 3. 5 is an outerguard such as commonly fitted to guard the mechanism from mud and dust. C is the commutator and $D_1$ the brushes. $D_2$ are the brush holders, shown diagrammatically as insulated guides, carried on the bracket E which also carries the terminals $D_3$, $D_4$ with which the brushes are in electrical connection by the flexible leads shown. The brushes are furnished with springs (not shown).

Referring more particularly to Figures 6, 7, 8, F is a storage battery and $G_1$, $G_2$ and $H_1$ and $H_2$ are the brush contacts of a controller which is shown of the commutator or drum type and of which the segments J and K serve to make the necessary connections and control the régime. The brush L serving the shunt winding is shown as working on the interior of the controller drum where is registers with an inward projection on the segment J as shown in Figure 8: it will be understood that this brush is placed internally merely for the purpose of illustration in order that the connections may be clearly shown on the diagram; in practice it would be more conveniently arranged on the exterior of the drum to register with a branch of the segment J extending axially. The position of the controller drum given in Figure 6 is that adapted to reverse the direction of the engine and propel the vehicle backwards, the position shown in Figure 7 being the normal engine starting and auxiliary drive (forward running) position. In both of these the shunt is cut out and the dynamo electric machine is acting as a series motor. It will be seen that the direction of the current, which is indicated by arrows, is reversed in the armature by the movement of the controller drum from the one position to the other. It is evidently equally possible to arrange the wiring so that the direction of the current in the field (series) winding is reversed in place of that in the armature, the result being the same. In Figure 8 the shunt is cut in and the single-headed arrows show the direction of the current when the speed of revolution is low and the dynamo electric machine is acting as a motor; it is now a compound wound motor and the series and shunt windings act to reinforce one another. When the critical speed is exceeded the armature back E. M. F. exceeds the battery voltage and charging of the accumulator or storage battery takes place, the direction of the current being shown in Figure 8 by the double-headed arrows. The series winding now acts to diminish the strength of the field and so the strength of the current tends to a limiting value as the speed of revolution increases.

The limiting value reached by the current, or rather its approach to this limiting value at high speed, would normally result in far too high a charging rate unless a battery of excessive size and weight were carried, that is to say if the compound winding were carried out in the usual manner or the series and shunt coils superposed or arranged in juxtaposition. It is one of the objects of the present invention to exercise a closer control over the limiting value aforesaid in order that at no ordinary running speed shall over-rapid charging take place. With this object the series windings are arranged on or around the poles themselves while the shunt winding is situated in the central part of the field magnet with regions between the series and shunt where the core is bare and from which magnetic leakage can take place. Such a form of winding results in there being three distinct circuits in the field system and the magnetic lines of force by their paths define these three circuits as follows:—(1) lines which "loop" both series and shunt windings, (2) lines which loop series windings only, (3) lines which loop shunt windings only. In the latter two the lines complete their paths by way of the leakage forming together an external leakage field which is small when the shunt and series are acting in concert but considerable when the shunt and series are opposed. The extent of the leakage permitted depends upon the area and form of the surface of the field core exposed or effectively exposed between the windings and may be increased by increasing these surfaces and by providing them with sharp corners or projections to any extent desired even to the extent of providing an external iron by-pass circuit to promote leakage as suggested in Figure 5 and figured $B_5$.

It is generally desirable to provide a rheostat in order to limit the starting current (when its full value is not required). A suitable point in the circuit for the introduction of such a rheostat is indicated at M in Figure 6. Alternatively, the rheostat may be embodied in the controller itself, the said controller being furnished with the usual stepped contacts. Where a rheostat is not employed it is desirable to design the controller with quick-break contacts as customary in switch gear.

The object of the disposition of the windings on the field magnets aforesaid is in order that when the series windings are acting in opposition to the shunt winding during charging their potency and corrective influence may be greater than would be the case if the two windings were superposed. Thus the series winding not only diminishes the total ampere turns as the current gets greater but it has the effect of rejecting a part of the shunt field through the leakage circuit and so lowers the limiting current with which the battery is served and prevents desrcuction of the plates of same.

It is convenient and beneficial to arrange the four poles of the dynamo electric machine other than at 90° to one another, that is to say the poles produced by each of the two electromagnets may be nearer one to the other as to angle subtended than the complementary pole spaces. In this disposition the brushes on the commutator are arranged to short a considerable number of the armature windings at the top and bottom of the armature and so considerably diminish the armature resistance. The disposition also shortens the magnetic circuits so far as the field magnets are concerned and so economizes material and energy required for excitation.

The dynamo electric machine being under the necessity of functioning both as a dynamo and as a motor under widely adverse conditions in order to prevent sparking carbon brushes are employed, but in order to diminish resistance in addition to the carbon brushes copper brushes or composition brushes of high conductivity are used in conjunction with the carbon brushes but arranged to subtend a lesser angle so that the brush system may be considered as comprising a metallic or highly conducting brush with carbon fringes. Such a construction of composite brush is illustrated in Figure 9, wherein 6 represents the copper element and 7, 7 represent the carbon elements disposed on both sides thereof. The controller brushes may be compound brushes constructed in like manner and the controller may be furnished with additional brushes and rheostat resistances in the customary manner to limit the initial current when the circuit is closed and to diminish sparking when the circuit is broken.

It is understood that although the present system is adapted to be operated without a clutch it is in some cases advantageous that a clutch should be fitted between the power unit and the transmission mechanism in order that the power unit may be run for inspection and test or for charging batteries independently of the car; such a clutch may be a magnetic clutch or simple dog clutch and may or may not be placed under control of the driver. Where no such clutch is fitted it is desirable to supply an independent charging set of comparatively small capacity mounted on the vehicle.

Having now described my invention, what I claim as new and desire to secure by Letters Patent is:—

1. A petrol electric system for automobile vehicles including in combination a prime mover, a storage battery and a direct current dynamo electric machine embodying a plurality of field magnet units, each unit comprising a pair of series windings disposed around the pole pieces and immediately adjacent the armature and a shunt winding, said windings being widely spaced apart and the intervening spaces between said windings being adapted to promote magnetic leakage during the charging régime.

2. A petrol electric system as claimed in claim 1, wherein the field magnets comprise a plurality of pairs of separate horseshoe magnets, each of which during the charging régime is excited by a reverse compounded series winding and by a shunt winding.

3. A petrol electric system for automobile vehicles including in combination a prime mover, a storage battery and a direct current dynamo electric machine embodying an armature, a plurality of mutually separated horseshoe electromagnets disposed equidistantly around the said armature, a shunt field coil and a pair of series field coils on each of said electromagnets, said latter pair of coils being widely spaced apart in relation to said shunt field coils, whereby during reversed compounded conditions of operation magnetic leakage is promoted.

In testimony whereof I have signed my name to this specification.

FREDERICK WILLIAM LANCHESTER.